United States Patent [19]
Min-Lang et al.

[11] Patent Number: 5,726,812
[45] Date of Patent: Mar. 10, 1998

[54] LOCKING MECHANISM OF ZOOM LENS

[75] Inventors: Hsieh Min-Lang, Hsin Chu Hsien; Chia-Jen Ting, Hsien, both of Taiwan

[73] Assignee: Industrial Technology Research Institute, Hsinchu, Taiwan

[21] Appl. No.: 636,415

[22] Filed: Apr. 23, 1996

[51] Int. Cl.$^6$ .................................................. G02B 15/22
[52] U.S. Cl. .................................................. 359/702
[58] Field of Search .................................................. 359/702

[56] References Cited

U.S. PATENT DOCUMENTS 4,466,709 8/1984 Osawa .................................................. 359/702

Primary Examiner—David C. Nelms
Assistant Examiner—Thomas Robbins
Attorney, Agent, or Firm—W. Wayne Liauh

[57] ABSTRACT

A locking mechanism of zoom lens which is primarily applied on zoom lens to prevent the lens group of the zoom lens to prevent the lens group of the zoom lens structure from entering into the non-zooming zone of the curvilinear slots through its zooming zone. The said locking mechanism of zoom lens mainly consists of a reverse rotation stopping block, a spring-loaded restoring slider, a stopping piece and a cap. Among them, the reverse rotation stopping block is fixed at the linear-slot-sleeve in the said zoom lens structure through the transverse slot of curvilinear-slot-sleeve and the outer sleeve in the said zoom lens structure; the cap is fixed on the said stopping block, and the said stopping piece has one end with inclined plane which can make the reverse rotation stopping block to move, only in one direction, along the transverse slots on the curvilinear-slot-sleeve and its outer sleeve and enable the lens group of the said zoom lens structure to enter into the zooming operation zone of the said curvilinear-slot-sleeve through the non-zooming operation zone of the said curvilinear-slot-sleeve to perform zooming action. Whenever one does not need to use the zoom lens, one can press the cap directly to make the inclined plane's end retreat from the transverse slot of the outer sleeve which, in sequence, makes the lens group enter the zooming operation zone of the said curvilinear slots through the non-zooming operation zone of the said curvilinear slots to attain the object of shortening the zoom lens.

6 Claims, 7 Drawing Sheets

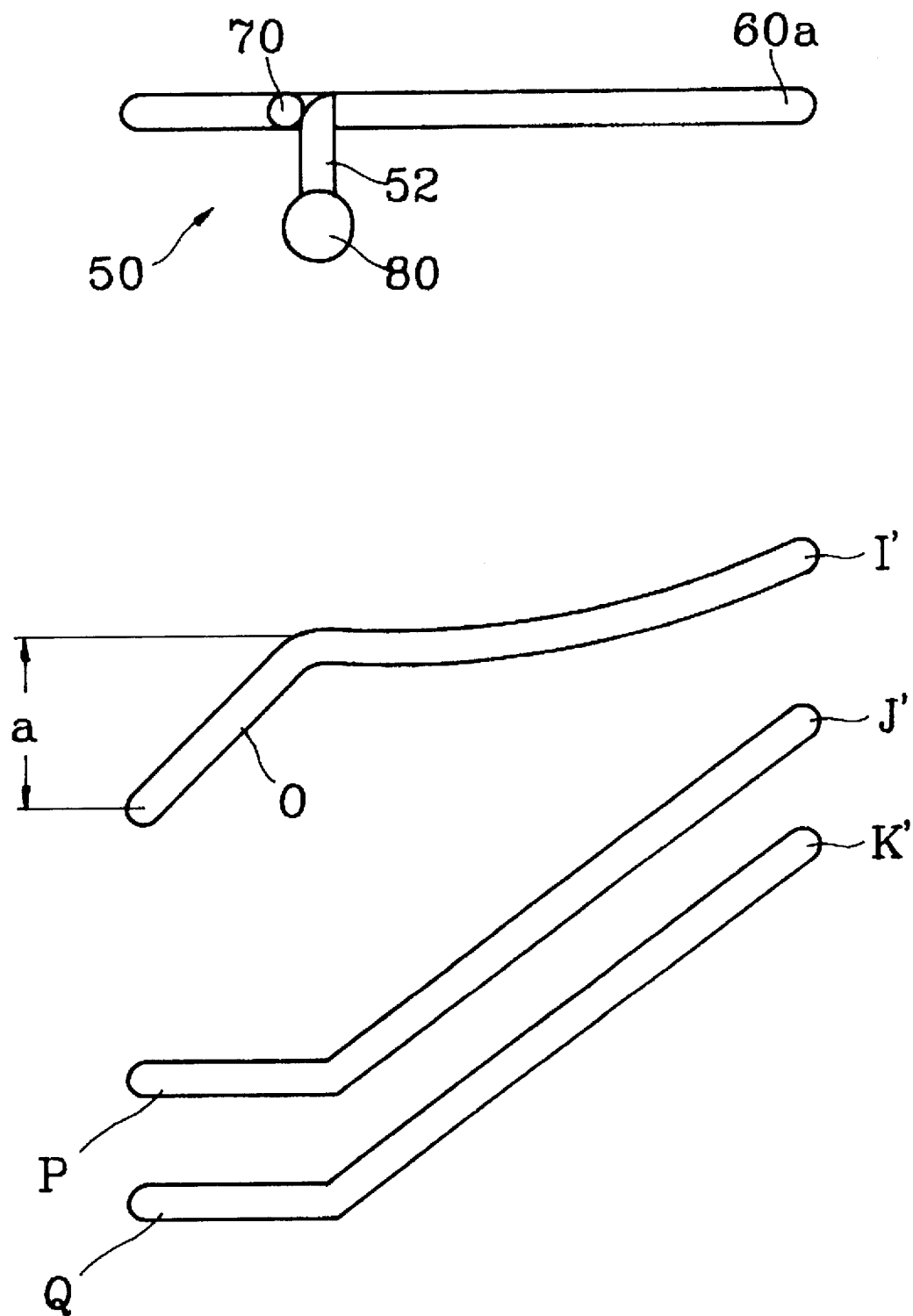
F I G. 6

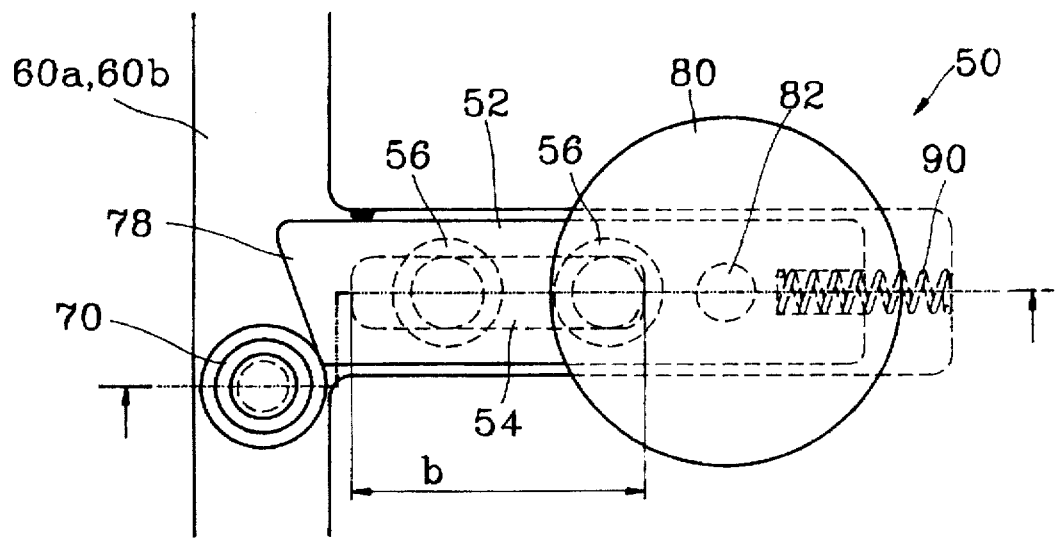
F I G. 7
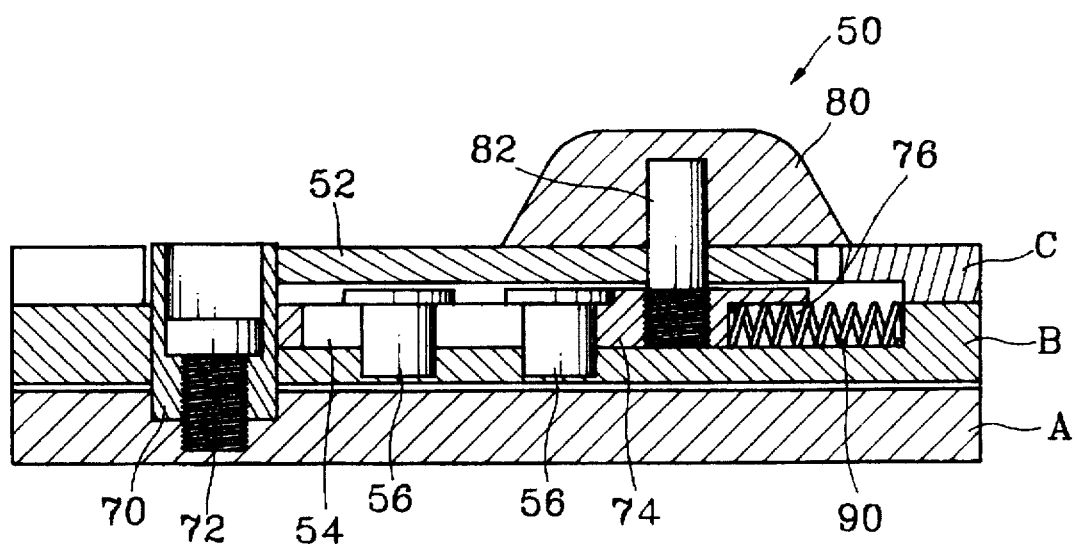
F I G. 8

LOCKING MECHANISM OF ZOOM LENS

FIELD OF INVENTION

The present invention is a locking mechanism of zoom lens, especially, a locking mechanism of zoom lens applied in short lens.

BACKGROUND OF THE INVENTION

The projective television prevailing on the market nowaday can be classified into two kinds, those with single focus and those with multifocus, if one intend to watch television with large screen by use of the ones with single focus, he must move the projective television in order to attain the effect of changing the magnification but if he uses the ones with multifocus, he can attain the effect of changing the magnification by use of its zooming function. This is very helpful for watching room with limited space or for projective television installed at a fixed location.

But the prior art of zoom lens structures are all very complicated and are very inconvenient when it comes to use them. Thereby, somebody developed an improved zoom lens structure to resolve the shortcomings of the prior art's technique.

The improved type of zoom lens structure of a kind of prior art as shown in FIG. 1 and FIG. 2, consists of a linear-slot-sleeve (A), a curvilinear-slot-sleeve (B) and an outer sleeve (C), the first lens set barrel (D), the second lens set barrel (E) and the third lens set barrel (F). Among them, the linear-slot-sleeve (A) comprises several extended type of linear slots (H), while the curvilinear-slot-sleeve (B) comprises the first curvilinear-slot-sleeve (I), the second curvilinear-slot-sleeve (J) and the third curvilinear-slot-sleeve (K); The outer surface of each of the lens set barrel all has several rollers (G). The said linear-slot-sleeve (A) can be contained in the said curvilinear-slot-sleeve and can have relative rotation with it, while the curvilinear-slot-sleeve (B) is fixed inside the outer sleeve (C) and can have synchronized rotation with it. The first lens set barrel (D), the second lens set barrel (E) and the third lens set barrel (F) are set up to be contained in the said linear-slot-sleeve (A) by use of the rollers (G) on their outer surface while the rollers (G) are inserted into the curvilinear slots (I), (J), (K) of the said curvilinear-slot-sleeve (B) through the extended type linear slot (H) of the said linear-slot-sleeve (A), thereby, the said curvilinear-slot-sleeve (B) can rotate accordingly to perform relative motion among the first lens set barrel (D), the second lens set barrel (E) and the third lens set barrel (F) to attain the object of zooming when the outer sleeve (C) is driven to rotate.

But this improved type of zoom lens structure has relatively longer lens and occupies larger volume, hence, another kind of zoom lens structure with short lens was proposed and was expected to shorten the length of zoom lens.

FIG. 3 is the exploded view of the zoom lens structure of one of the prior art with short lens. The short lens of the zoom lens structure mainly adds a non-zooming operation zone (O), (P) and (Q) (or inward retreated zone of lens set barrel) at the first curvilinear slot (I'), the second curvilinear slot (J') and the third curvilinear slot (K') on the curvilinear-slot-sleeve. Referring to FIG. 4, the lens set barrel's inward retreated zone of the first curvilinear slot (I') is the linear slot area (O) which is bent downward while those of the second curvilinear slot (J') and the third curvilinear slot (K') are the slot areas (P) and (Q) respectively which are extended horizontally. As the lens set barrels (D), (E) and (F) move along the non-zooming zones (O), (P) and (Q) of the curvilinear slots (I'), (J') and (K') respectively, the zoom lens can induce zooming action. But when the lens barrel sets (D), (E) and (F) enter the non-zooming operation zones (O), (P) and (Q) of the curvilinear slots (I'), (J') and (K'), the first lens barrel set (D) can retreat to shorten the said zoom lens. As shown in FIG. 4, the downward bending length along the central axis of the curvilinear-slot-sleeve of the first curvilinear slot's (I') downward bending area (O) is the inward retreated length (the length "a" shown in the Figure of the zoom lens.

However, when it comes to adjust the prior art's zoom lens of short lens type, the user might subconsciously adjust the first lens set barrel (D), the second lens set barrel (E) and the third lens set barrel (F) into the non-zooming operation zone (O), (P) and (Q), thereby, is unable to make the zoom lens of the short lens type induce zooming action, and consequently, will affect the user's feeling on viewing the projective television.

In light of the shortcoming of the prior art's zoom lens structure of the short lens type, the inventors, thereby, through detailed study, design a locking mechanism of zoom lens to prevent the lens set barrel from entering into the non-zooming zone and affecting the user's feeling on viewing the projective television.

SUMMARY OF THE INVENTION

The main purpose of the present invention is to provide a locking mechanism of the zoom lens which can prevent the lens set barrel from entering into the non-zooming zones of the curvilinear slots that causing the zoom lens unable to induce zooming action.

BRIEF DESCRIPTION OF THE DRAWINGS AND THEIR COMPONENT NUMBERS

In order to make your honor examiners further understand the features and objectives of the present invention, the authors herewith illustrate as follows together with the accompanied drawings:

(A) The Drawings FIG. 1 is the isometric view of the prior art's zoom lens structure.

FIG. 6 is the schematic diagram of the installed location of the locking mechanism of zoom lens of the present invention.

FIG. 7 is the top view of the locking mechanism of zoom lens of the present invention.

FIG. 8 is cross section view of the locking mechanism of zoom lens of the present invention.

(B) The component number

Figure 1:
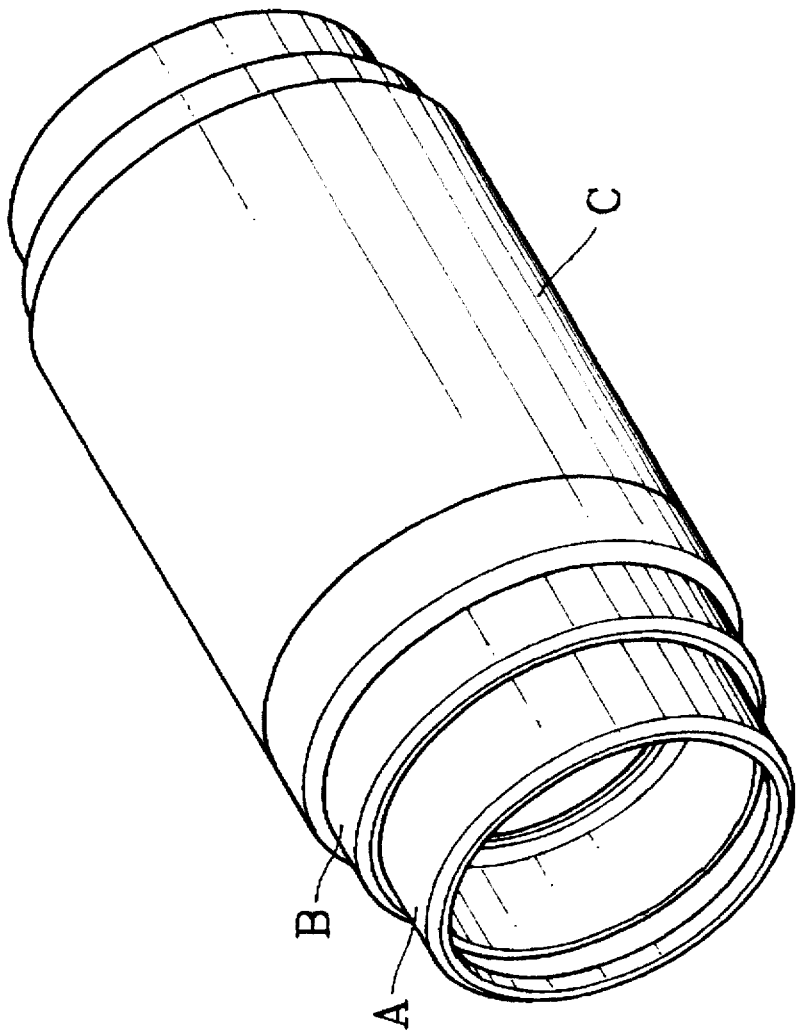
Figure 2:
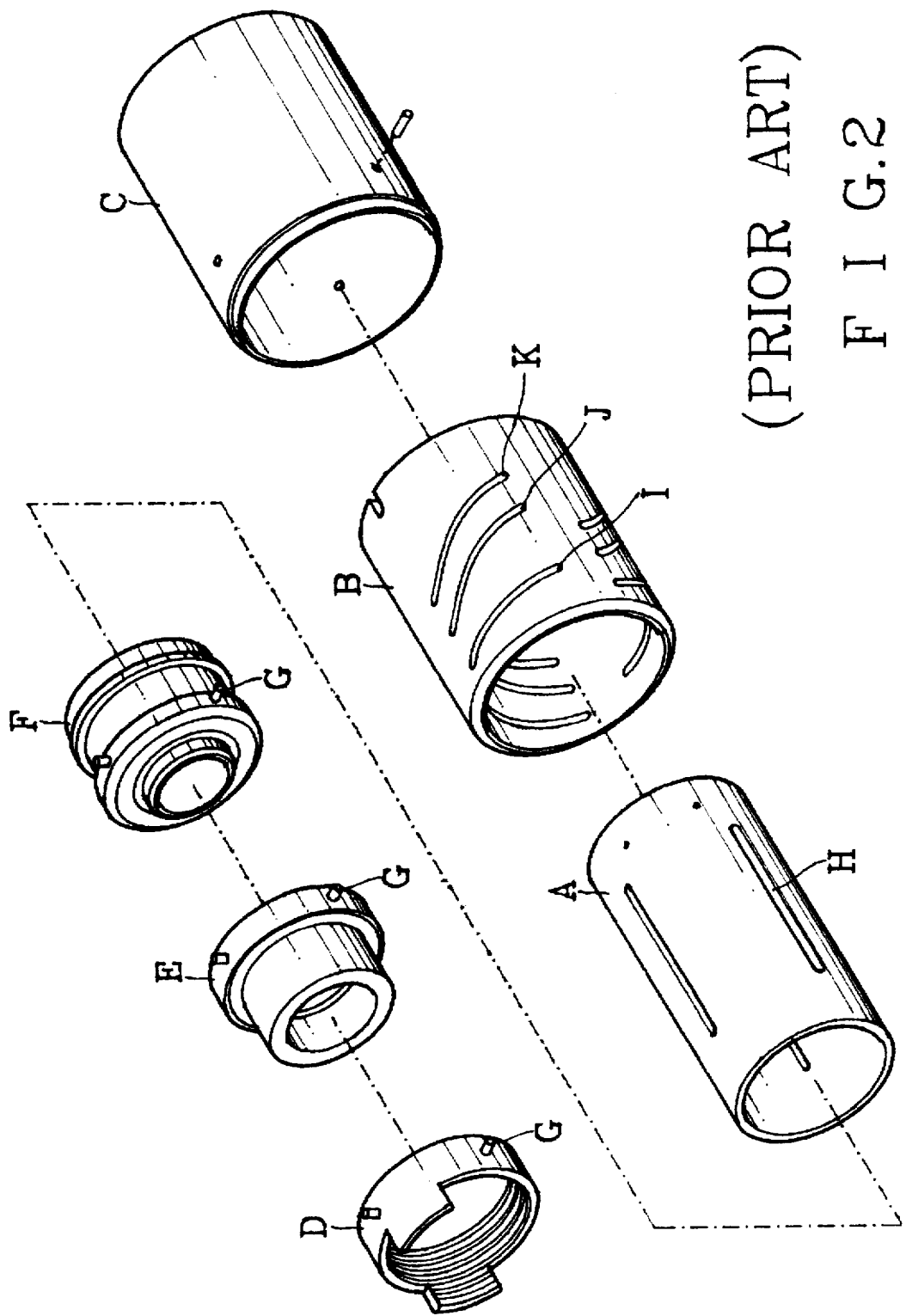
FIG. 2 is the exploded view of the prior art's zoom lens structure.
Figure 3:
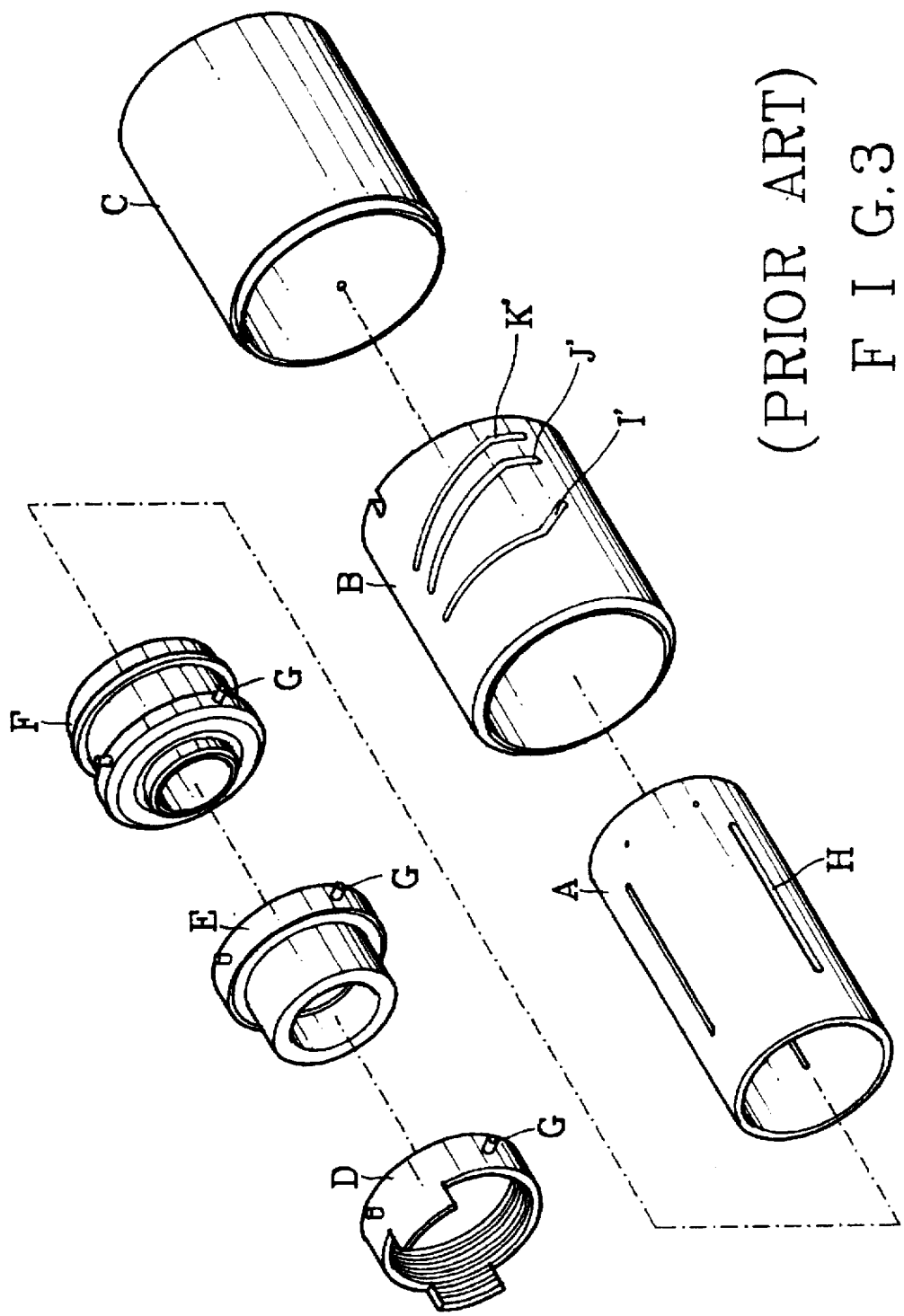
FIG. 3 is the exploded view of the prior art's zoom lens structure with short lens.
Figure 4:
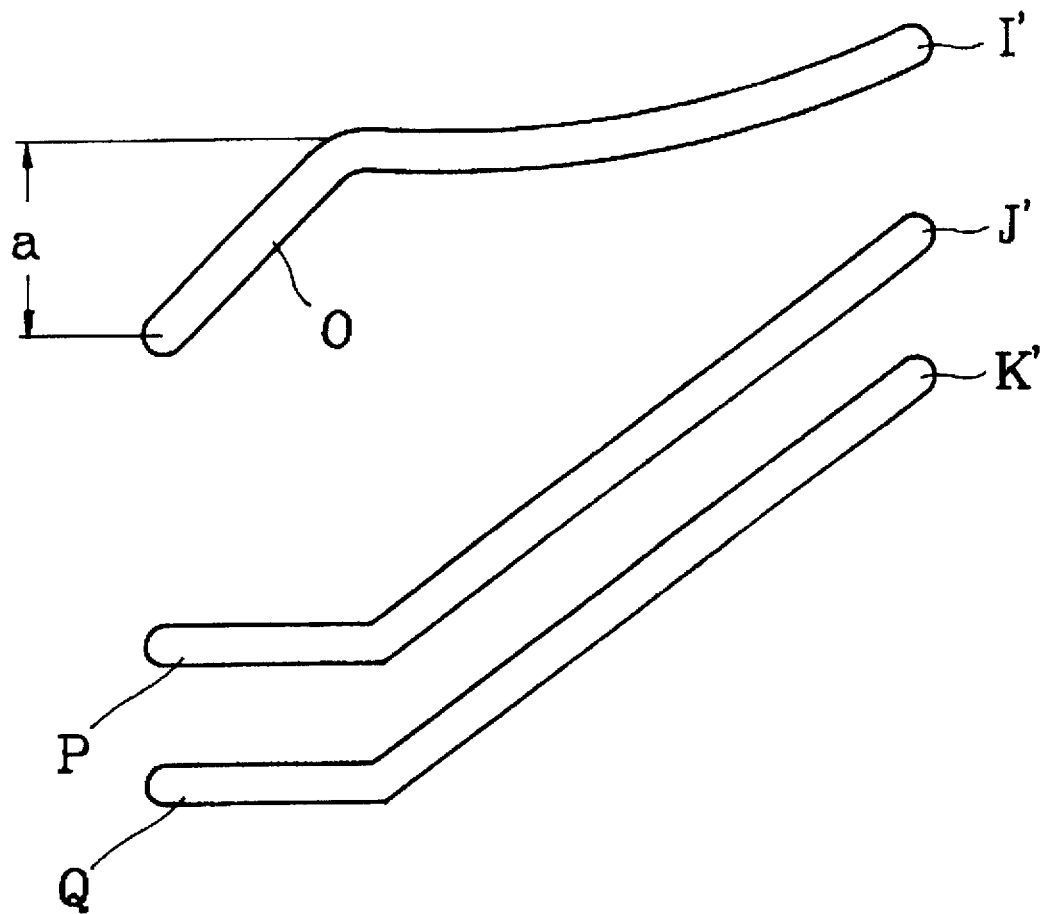
FIG. 4 is the schematic diagram of the curvilinear slot design on the curvilinear-slot-sleeve of the zoom lens structure with short lens.

(50) locking mechanism
(52) stopping piece
(54) cutting opening slot
(56) anti-slip pin
(60a) transverse slot of the curvilinear-slot-sleeve
(60b) transverse slot of the outer sleeve
(70) reverse rotation stopping block

(72) screw
(74) spring-loaded restoring slider
(76) spring-contained flute
(78) inclined plane end
(80) cap
(82) connecting pin
(90) compressive spring

DETAILED DESCRIPTION OF THE INVENTION

Figure 5:
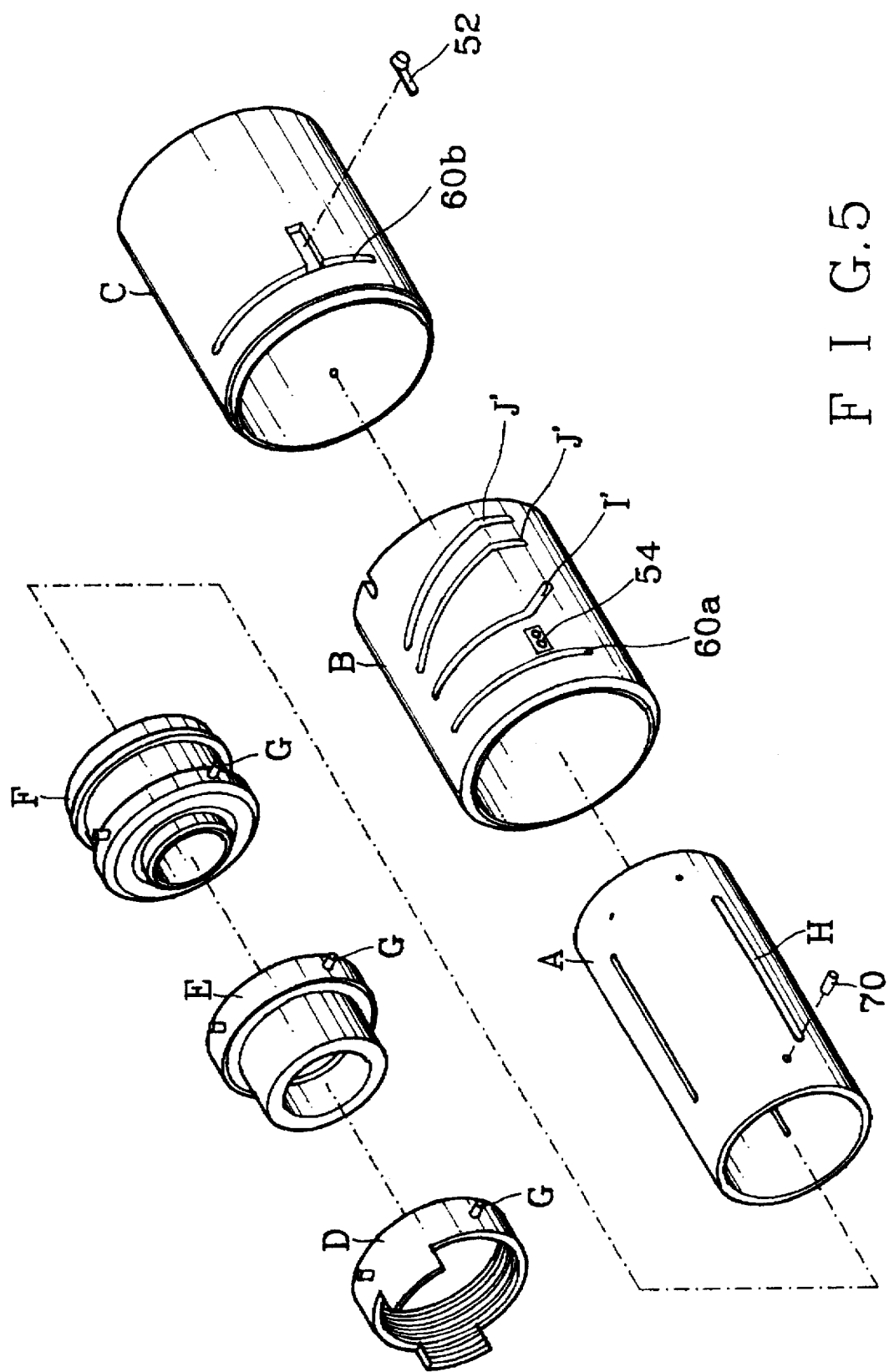
FIG. 5 is the parts layout of the locking mechanism of zoom lens of the present invention.

Referring to FIG. 5, there is one transverse slot (60a) added to the curvilinear-slot-sleeve (B) while there is also another transverse slot (60b) added to the outer sleeve the two transverse slots are corresponding to each other. FIG. 6 shows the installed location zoom lens locking mechanism (50) of the present invention where the installed location of the zoom lens locking mechanism (50) is corresponding with the intersection area of curvilinear slot's zooming operation zone and its non-zooming operation zone (O), (P), (Q).

FIG. 7 and FIG. 8 are the top view and cross-section view of the locking mechanism of the present invention where the said locking mechanism (50) comprises a reverse rotation stopping block (70), a stopping piece (52), a spring-loaded restoring slider (74) and a cap (80); the said reverse rotation stopping block (70) is fixed to the linear-slot-sleeve (A) by use of a screw (72) through the transverse slot (60b) of the outer sleeve (C) and the transverse slot (60a) of the curvilinear-slot-sleeve (B); the said stopping piece (52) possesses an end with inclined plane (78) which is placed in the transverse slot (60b) of the outer sleeve (C). This inclined plane end (78) can make the said reverse rotation stopping block (70) pass through the said transverse slot (60a) (60b) only in one direction; the said spring-loaded restoring slider (74) comprises a cutting opening slot (54) and a spring-contained flute (76) which installed a compressive spring (90) to provide the spring-loaded restoring slider (76) with restoring spring force; the said cutting opening slot (54) has a preset length (as shown in b length) with an anti-slip pin (56), thereby, the said spring-loaded restoring slider (74) can slide within the presetted length while the said anti-slip pin (56) can limit the sliding distance of the said spring-loaded restoring slider (76); as shown in the figures, a connecting pin (82) is employed to connect the stopping piece (52) and slider (74) to transmit the spring force of the compressive spring (90) to the stopping piece (52); the cap (8) covers the top end of the connecting pin (82) to form a push button, as one push the said button to overcome the spring force of the said stopping piece (52) applied by the compressive spring (90), the inclined plane end (78) on the stopping piece (52) will retreat from the transverse slot (60b) on the said outer sleeve.

Referring again to FIG. 7 and FIG. 8, as the zoom lens of the present invention performs zooming operation, the first lens set barrel (D), the second lens set barrel (E) and the third lens set barrel (F) can enter, from the non-zooming operation zone (O), (P), (Q) of the curvilinear slot (I'), (J'), (K') into their zooming operation zone while the said reverse rotation stopping block (70) will enable the zoom lens to perform zooming action through the front edge of the stopping piece's inclined plane end. During the process of zooming operation, the reverse rotation stopping block (70) will be stopped by the rear edge of the said stopping piece's inclined plane end (78) to prevent the lens set barrels (D), (E), (F) from entering into the retreated zone (O), (P), (Q), thereby, to make the zoom lens unable to attain the purpose of zooming, consequently, affect the user's feeling. However, as the zoom lens is not in use, in order to let the first lens set barrel (D), the second lens set barrel (E) and the third lens set barrel (F) enter into the non-zooming operation zone (O), (P), (Q), the users can press the cap (80) to make the inclined plane end retreat completely from the outer sleeve's transverse slot (60b), thereby, to enable the reverse rotation stopping block (70) to enter into the non-zooming operation zone (O), (P), (Q) of the curvilinear-slot-sleeve (B) to attain the object of shortening the zoom lens.

To summarize the above-mentioned statement, the locking mechanism of the present invention's zoom lens makes use of the assembly of the reverse rotation stopping block (70), stopping piece (52), spring-loaded restoring slider (74), cap (80) and compressive spring (90) to prevent the lens set barrel of the zoom lens from entering into the non-zooming operation zone of the curvilinear slot, thereby, to make the operation of zoom lens with short lens much more convenient.

Although the present invention has been illustrated and described previously with reference to the preferred embodiments thereof, it should be appreciated that it is in no way limited to the details of such embodiments, but is capable of numerous modification within the scope of the appended claims.

What is claimed is:

1. A zoom lens locking mechanism for use in zoom lens structure with a short lens, comprising:

a linear-slot-sleeve, further comprising several extended type linear slots;

a curvilinear-slot-sleeve, further comprising a transverse slot and several curvilinear slots and for each curvilinear slot further containing a zooming operation zone and a non-zooming operation zone, and said linear-slot-sleeve is contained in said curvilinear-slot-sleeve and can perform relative motion with said curvilinear-slot-sleeve;

an outer sleeve, further containing a transverse slot, and said curvilinear-slot-sleeve is fixed inside said outer sleeve is fixed inside said outer sleeve and can have synchronized rotation with said outer sleeve, also said transverse slot on said curvilinear-slot-sleeve is correspondent to said transverse slot on said outer sleeve;

a plurality of lens set barrels, each of them further possessing a plurality of rollers which pass through said extended type linear slot of said extended type sleeve and insert into the curvilinear slots of said curvilinear-slot-sleeve;

a reverse rotation stopping block which is fixed in said linear-slot-sleeve as well as those of said outer sleeve;

a spring-loaded restoring slider, further comprising a cutting opening slot and a spring-contained flute, said spring-loaded restoring slider is installed on the surface of said curvilinear-slot-sleeve and its location is correspondent to the intersection area of the zooming operation zone and the zone-zooming operation zone of said curvilinear slot;

a stopping piece, further comprising an inclined plane end which is placed in the transverse slot of said outer sleeve and said stopping piece is connected to said slider which enable the compressive spring force to transmit to said stopping piece; and a cap which is fixed on the outer surface of said stopping piece;

wherein the cutting opening slot has a preset length and contains at least an anti-slip pin, thereby, said spring-loaded restoring slider slides within the preset length, and said anti-slip pin limits the sliding distance of the spring-loaded restoring slider.

2. A zoom lens locking mechanism as claimed in claim 1 where said spring-contained flute contains a compressive spring to provide said spring-loaded restoring slider with a restoring spring force.

3. A zoom lens locking mechanism for use in zoom lens structure with a short lens, comprising:

a linear-slot-sleeve, further comprising several extended type linear slots;

a curvilinear-slot-sleeve, further comprising a transverse slot and several curvilinear slots and for each curvilinear slot further containing a zooming operation zone and a non-zooming operation zone, and said linear-slot-sleeve is contained in said curvilinear-slot-sleeve and can perform relative motion with said curvilinear-slot-sleeve;

an outer sleeve, further containing a transverse slot, and said curvilinear-slot-sleeve is fixed inside said outer sleeve is fixed inside said outer sleeve and can have synchronized rotation with said outer sleeve, also said transverse slot on said curvilinear-slot-sleeve is correspondent to said transverse slot on said outer sleeve;

a plurality of lens set barrels, each of them further possessing a plurality of rollers which pass through said extended type linear slot of said extended type sleeve and insert into the curvilinear slots of said curvilinear-slot-sleeve;

a reverse rotation stopping block which is fixed in said linear-slot-sleeve as well as those of said outer sleeve;

a spring-loaded restoring slider, further comprising a cutting opening slot and a spring-contained flute, said spring-loaded restoring slider is installed on the surface of said curvilinear-slot-sleeve and its location is correspondent to the intersection area of the zooming operation zone and the zone-zooming operation zone of said curvilinear slot;

a stopping piece, further comprising an inclined plane end which is placed in the transverse slot of said outer sleeve and said stopping piece is connected to said slider which enable the compressive spring force to transmit to said stopping piece; and a cap which is fixed on the outer surface of said stopping piece;

wherein said inclined plane end can make said reverse rotation stopping block move only in one direction along said two transverse slots, thereby, can make said lens set barrel enters from the non-zooming zone of said curvilinear slot into the zooming zone of said curvilinear slot to perform zooming action, thus can limit said lens set barrel to enter from the zooming operation zone into the non-zooming operation zone of said curvilinear slot.

4. A zoom lens locking mechanism as claimed in claim 3 wherein said spring-contained flute contains a compressive spring to provide said spring-loaded restoring slider with a restoring spring force.

5. A zoom lens locking mechanism for use in zoom lens structure with a short lens, comprising:

a linear-slot-sleeve, further comprising several extended type linear slots;

a curvilinear-slot-sleeve, further comprising a transverse slot and several curvilinear slots and for each curvilinear slot further containing a zooming operation zone and a non-zooming operation zone, and said linear-slot-sleeve is contained in said curvilinear-slot-sleeve and can perform relative motion with said curvilinear-slot-sleeve;

an outer sleeve, further containing a transverse slot, and said curvilinear-slot-sleeve is fixed inside said outer sleeve is fixed inside said outer sleeve and can have synchronized rotation with said outer sleeve, also said transverse slot on said curvilinear-slot-sleeve is correspondent to said transverse slot on said outer sleeve;

a plurality of lens set barrels, each of them further possessing a plurality of rollers which pass through said extended type linear slot of said extended type sleeve and insert into the curvilinear slots of said curvilinear-slot-sleeve;

a reverse rotation stopping block which is fixed in said linear-slot-sleeve as well as those of said outer sleeve;

a spring-loaded restoring slider, further comprising a cutting opening slot and a spring-contained flute, said spring-loaded restoring slider is installed on the surface of said curvilinear-slot-sleeve and its location is correspondent to the intersection area of the zooming operation zone and the zone-zooming operation zone of said curvilinear slot;

a stopping piece, further comprising an inclined plane end which is placed in the transverse slot of said outer sleeve and said stopping piece is connected to said slider which enable the compressive spring force to transmit to said stopping piece; and a cap which is fixed on the outer surface of said stopping piece;

wherein said zoom lens locking mechanism is structured such that, when the zoom lens is not in use, a user can press the cap to make the stopping piece's inclined plane end retreat from the outer sleeve's transverse slot, thus, causing said lens barrel to enter from the zooming operation zone into a non-zooming operation zone of said curvilinear slot to attain the object of shortening the zoom lens.

6. A zoom lens locking mechanism as claimed in claim 5 wherein said spring-contained flute contains a compressive spring to provide said spring-loaded restoring slider with a restoring spring force.

* * * * *